(12) United States Patent
Kim et al.

(10) Patent No.: US 12,434,992 B2
(45) Date of Patent: Oct. 7, 2025

(54) HEAT CHAMFERING APPARATUS AND METHOD

(71) Applicant: Corning Incorporated, Corning, NY (US)

(72) Inventors: Euisoo Kim, Seongnam-si (KR); Bokyung Kong, Hwasung (KR); JooYoung Lee, Anyang-si (KR); Kwangje Woo, Suwon-si (KR)

(73) Assignee: CORNING INCORPORATED, Corning, NY (US)

( * ) Notice: Subject to any disclaimer, the term of this patent is extended or adjusted under 35 U.S.C. 154(b) by 158 days.

(21) Appl. No.: 18/285,279

(22) PCT Filed: Mar. 31, 2022

(86) PCT No.: PCT/US2022/022792
§ 371 (c)(1),
(2) Date: Oct. 2, 2023

(87) PCT Pub. No.: WO2022/212683
PCT Pub. Date: Oct. 6, 2022

(65) Prior Publication Data
US 2024/0182348 A1    Jun. 6, 2024

(30) Foreign Application Priority Data

Apr. 1, 2021 (KR) .......................... 10-2021-0042830

(51) Int. Cl.
*C03B 33/09* (2006.01)
*B28D 1/22* (2006.01)

(52) U.S. Cl.
CPC .............. *C03B 33/09* (2013.01); *B28D 1/221* (2013.01)

(58) Field of Classification Search
CPC ..... C03B 33/105; C03B 33/107; C03B 33/12; C03B 23/0086; C03B 33/02;
(Continued)

(56) References Cited

U.S. PATENT DOCUMENTS 6,051,821 A    4/2000  Dahl et al.
7,278,806 B1 * 10/2007  Clayton .................... B23C 5/10
                                                    407/53
(Continued)

FOREIGN PATENT DOCUMENTS

KR    10-1345587 B1    12/2013
KR    10-1405442 B1     6/2014
(Continued)

OTHER PUBLICATIONS

European Patent Application No. 22782196.4 Extended European Search Report dated Jan. 3, 2025; 7 Pages; European Patent Office.
(Continued)

*Primary Examiner* — Matthew J Daniels (57) ABSTRACT

A heat chamfering apparatus includes a heated body configured to peel an edge of a glass panel by applying thermal shock to the glass panel while being in contact with the edge of the glass panel and a heater heating the heated body. The heated body includes a heated region and a contact region in a longitudinal direction thereof, the heated region being heated by the heater, and the contact region being configured to be in contact with the glass panel. The cross-sectional area of the contact region is smaller than the cross-sectional area of the contact region. A heat chamfering method includes peeling an edge of a glass panel by applying thermal shock to the edge of the glass panel by moving a heated body heated by a heater relatively with respect to the glass panel along and in contact with the edge of the glass panel.

20 Claims, 8 Drawing Sheets

(58) Field of Classification Search
CPC ....... C03B 33/023; C03B 33/09; B28D 1/221; B28D 1/30; B23C 3/12; B23C 3/126; B24B 9/065; H01L 21/02021
See application file for complete search history.

(56) References Cited

U.S. PATENT DOCUMENTS

| | | | | |
|---|---|---|---|---|
| 9,957,188 | B2* | 5/2018 | Kwon | ............... C03B 33/09 |
| 2005/0220555 | A1* | 10/2005 | Baber | ................. B27C 1/10 |
| | | | | 409/182 |
| 2007/0122245 | A1* | 5/2007 | Yanagimoto | .......... B23B 51/101 |
| | | | | 407/53 |
| 2008/0296277 | A1* | 12/2008 | McAninch | ........... B23K 9/1093 |
| | | | | 219/136 |
| 2011/0107894 | A1* | 5/2011 | Maekawa | ............... C03B 33/09 |
| | | | | 83/869 |
| 2015/0013391 | A1 | 1/2015 | Kim | |
| 2016/0016325 | A1* | 1/2016 | Paharik | ................. B26D 7/26 |
| | | | | 83/676 |

FOREIGN PATENT DOCUMENTS

| | | |
|---|---|---|
| KR | 20-2016-0001891 U | 6/2016 |
| TW | I661901 B | 6/2019 |
| WO | 2016/060381 A1 | 4/2016 |
| WO | WO-2016060386 A1 * | 4/2016 ............... B24B 9/10 |

OTHER PUBLICATIONS

Lee et al., "Advanced Chamfering Technology for Edge Strengthening", J. Am. Ceram. Soc., 97[8], 2014, pp. 2364-2367.
International Search Report and Written Opinion of the International Searching Authority; PCT/US2022/022792; mailed on Jun. 9, 2022, 09 pages; International Searching Authority.

* cited by examiner

HEAT CHAMFERING APPARATUS AND METHOD

BACKGROUND

Cross-Reference to Related Applications

This application claims the benefit of priority under 35 U.S.C. § 371 of International Application No. PCT/US2022/022792, filed on March 31, 2022, which claims the benefit of priority under 35 U.S.C. § 119 of Korean Patent Application Serial No. 10-2021-0042830 filed on Apr. 1, 2021, the content of which are relied upon and incorporated herein by reference in their entirety.

FIELD

The present disclosure relates generally to a heat chamfering apparatus and method and, more particularly, to a heat chamfering apparatus and method able to prevent a glass panel from being damaged while providing superior power efficiency.

DESCRIPTION OF RELATED ART

An edge defect of a glass panel is a main factor of damage reducing the reliability of the glass panel. In particular, in a flexible device including a thin glass panel that requires guaranteed edge quality for reliable bending performance, the reliability of the edge quality of a glass panel is critically important.

Edge finishing is performed in order to improve the strength of edges of a glass panel. From among technologies used for such edge finishing, heat chamfering technology is known. Heat chamfering is a technology suitable for use with thin glass plates, since no particles are created thereby. In addition, Heat chamfering may ensure superior edge strength and provide satisfactory bending performance.

SUMMARY

Various aspects of the present disclosure provide a heat chamfering apparatus and method able to obtain a necessary processing temperature and superior power efficiency.

Also provided are a heat chamfering apparatus and method able to prevent a heated body from being deformed.

Also provided are a heat chamfering apparatus and method able to prevent a glass panel and organic and inorganic layers formed on the glass panel from being damaged.

Also provided are a heat chamfering apparatus and method able to be customized to a glass panel having a concave edge.

According to an aspect, the present disclosure may provide a heat chamfering apparatus including: a heated body configured to peel an edge of a glass panel by applying thermal shock to the glass panel while being in contact with the edge of the glass panel; and a heater heating the heated body.

In some embodiments, the heated body may include a heated region and a contact region in a longitudinal direction thereof, the heated region being heated by the heater, and the contact region being configured to be in contact with the glass panel. The cross-sectional area of the contact region may be smaller than the cross-sectional area of the contact region.

According to another aspect, the present disclosure may provide a heat chamfering method including: peeling an edge of a glass panel by applying thermal shock to the edge of the glass panel by moving a heated body heated by a heater relatively with respect to the glass panel along and in contact with the edge of the glass panel.

As set forth above, according to the present disclosure, the heat chamfering apparatus and method may obtain a necessary processing temperature and superior power efficiency.

In addition, according to the present disclosure, the heat chamfering apparatus and method may prevent a heated object from being deformed.

In addition, according to the present disclosure, the heat chamfering apparatus and method may prevent a glass panel and organic and inorganic layers formed on the glass panel from being damaged.

Furthermore, according to the present disclosure, the heat chamfering apparatus and method may be customized to a glass panel having a concave edge.

The methods and apparatuses of the present disclosure have other features and advantages that will be apparent from or that are set forth in greater detail in the accompanying drawings, the disclosures of which are incorporated herein, and in the following Detailed Description, which together serve to explain certain principles of the present disclosure.

DETAILED DESCRIPTION

Figure 1:
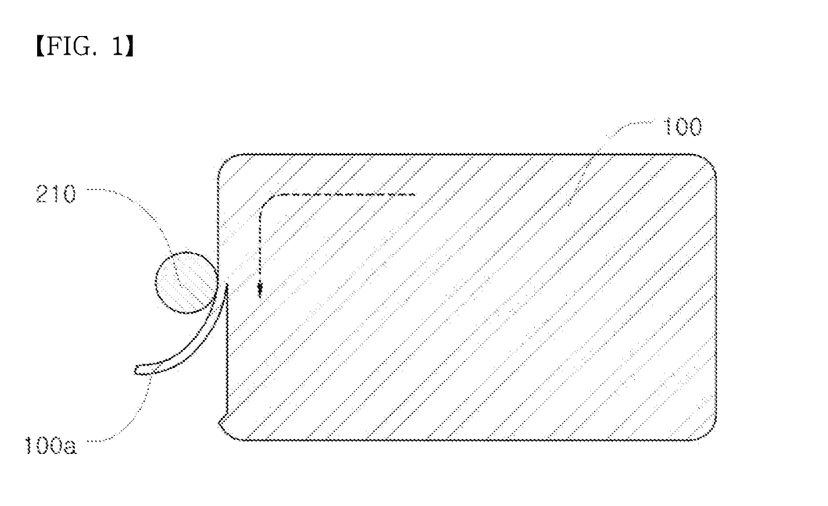
FIG. 1 is a view illustrating a method of heat-chamfering a glass panel according to an embodiment of the present disclosure.

FIG. 1 is a view illustrating a method of heat-chamfering a glass panel according to an embodiment of the present disclosure.

An edge of a glass panel 100 may be heat-chamfered by thermal shock applied thereto. The heated body 210 heated by the heater 220 may be relatively moved with respect to the glass panel 100 along the edge of the glass panel 100 while being in contact with the edge of the glass panel 100, thereby peeling the edge of the glass panel 100. For the relative movement, the glass panel 100 may be moved, the heated body 210 may be moved, or both the glass panel 100 and the heated body 210 may be moved.

Although the main plane of the glass panel 100 may have an oblong shape, the glass panel 100 is not limited to a specific shape and may have a polygonal shape, a circular shape, an elliptical shape, or the like. In the present disclosure, the glass panel 100 is not limited to a sheet having a thickness (e.g., the length in the Z-axis direction) smaller than either the transverse length (e.g., X-axis direction) or the longitudinal length (e.g., Y-axis direction) of the main plane. Rather, the glass panel 100 may have a variety of shapes, such as a thick block.

The glass panel 100 according to the present disclosure may include panels formed from any glass material (e.g., borosilicate glass).

When the main plane of the glass panel 100 has an oblong shape and defines an X-Y plane, the heated body 210 may chamfer the glass panel 100 by relatively moving in the X-axis direction and the Y-axis direction while sequentially being in contact with four edges of the glass panel 100. The speed of the relative movement may vary depending on the composition of the glass, the heating conditions, the shape of the glass panel 100 to be chamfered, or the like. In response to this chamfering, a strip 100a is peeled from the edges of the glass panel 100. In some embodiments, the heated body 210 may perform the chamfering while continuously coming into contact with the four edges without interruption. For example, when the four edges of the glass panel 100 are referred to as a first edge, a second edge, a third edge, and a fourth edge in the clockwise direction, the heated body 210 may chamfer all of the four edges of the glass panel 100 by relatively moving in the X-axis direction to the corner between the first edge and the second edge while being in contact with the first edge, relatively moving in the Y-axis direction to the corner between the second edge and the third edge while being in contact with the second edge, relatively moving in the X-axis direction (i.e., opposite to the direction in which the heated body 210 moves while in contact with the first edge) to the corner between the third edge and the fourth edge while being in contact with the third edge, and then, relatively moving in the Y-axis direction (i.e., opposite to the direction in which the heated body 210 moves while in contact with the second edge) to the corner between the fourth edge and the first edge while being in contact with the fourth edge.

This chamfering may peel the thin strip 100a from the glass panel 100 without creating particles, thereby preventing defects in the edges of the glass panel 100 and increasing the strength of the glass panel 100.

In some embodiments, the glass panel 100 may be chamfered while being fixedly located on the top surface of a fixing jig (not shown). A suction hole may be formed in the surface of the fixing jig to hold the glass panel 100 by suction. This suction hole may be connected to a vacuum pump. When the surface of the glass panel 100 is held by suction, no fixing tools are required to be provided on side portions of the glass panel 100 to hold the glass panel 100, so that the contact between the heated body 210 and the glass panel 100 may be performed without disruption along the four edges of the glass panel 100.

Figure 2:
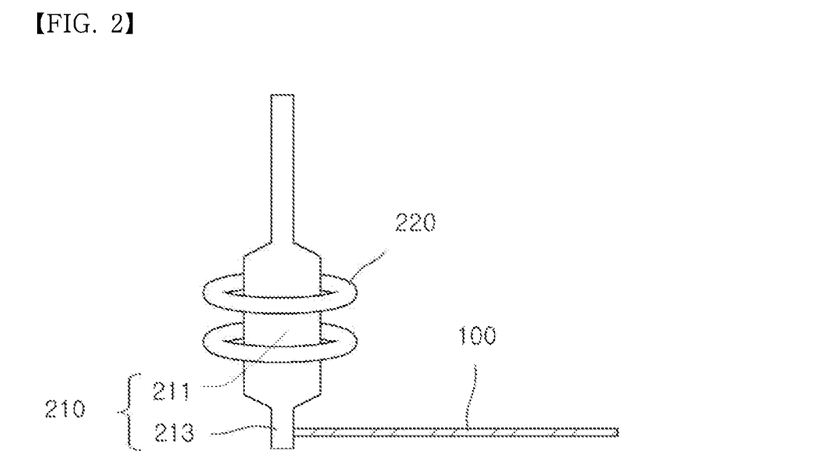
FIG. 2 is a view schematically illustrating a glass panel heat chamfering apparatus according to some embodiments of the present disclosure.

FIG. 2 is a view schematically illustrating a glass panel heat chamfering apparatus according to some embodiments of the present disclosure.

The heat chamfering apparatus may include the heated body 210 configured to peel the edges of the glass panel 100 by applying thermal shock to the glass panel 100 while being in contact with the edges of the glass panel 100 and the heater 220 heating heated body 210.

In some embodiments, the heated body 210 may include a heating rod. In some embodiments, a contact region 213 of the heated body 210 to be in contact with the glass panel 100 may have the shape of a cylinder. In some embodiments, the heated body 210 may be a metal rod. For example, the metal rod formed from $MoSi_2$ may be used as the heated body 210. However, the heated body 210 is not limited thereto.

The heated body 210 may include a heated region 211 and a contact region 213 in the longitudinal direction thereof, in which the heated region 211 may be heated by the heater 220, and the contact region 213 may be in contact with the glass panel 100. The cross-sectional area of the contact region 213 (on the plane parallel to the main plane of the glass panel 100) may be smaller than the cross-sectional area of the heated region 211. In some embodiments, the contact region 213 may have a circular cross-section with a diameter ranging from 3 mm to 8 mm, and the heated region 211 may have a circular cross-section with a diameter ranging from 6 mm to 15 mm. Heat applied to the heated region 211 may be transferred to the contact region 213. The contact region 213 may be located on one distal end of the heated body 210. The other distal end of the heated body 210 may be held by a holder (not shown).

At a specific point in time, the heated body 210 may be in point contact or line contact with the glass panel 100 (e.g., when a cylindrical heated body is in contact with the glass panel 100) or may be in surface contact with the glass panel 100 (e.g., when a heated body having a flat heating surface is in contact with the glass panel 100). In some embodiments, the line in the line contact and the surface in the surface contact may be parallel to a side surface (i.e., a thickness surface) of the glass panel 100. However, the present disclosure is not limited thereto and the contact line or surface may be at a predetermined angle to the side surface.

The heater 220 may heat the heated body 210 by high-frequency induction heating. The heater 220 may heat the heated body 210 while enclosing the heated body 210. In some embodiments, the heater 220 may be an induction coil. The heated body 210 may be located to extend through the center of the induction coil. In some embodiments, the induction coil may be implemented using a copper (Cu) coil. In addition, the induction coil may be coated with a ceramic material for electrical safety. In some embodiments, the outer diameter of the induction coil may be about 6 mm, the outer wall may be about 0.8 mm thick, and cooling water may flow at a flow rate of about 13 L/min within the induction coil. The induction coil may heat the heated body 210 to a temperature ranging from about 1200° ° C. to about 1300° C. by transmitting power to the heated body 210.

Figure 3:
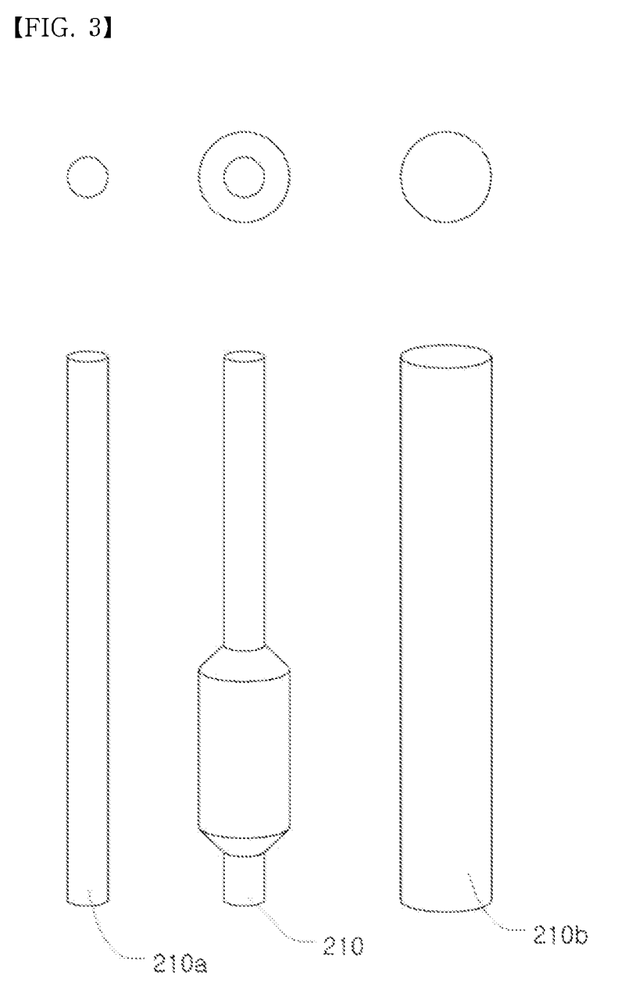
FIGS. 3 and 4 are views illustrating the relationship between the shape of the heated body and a required amount of power.
Figure 4:
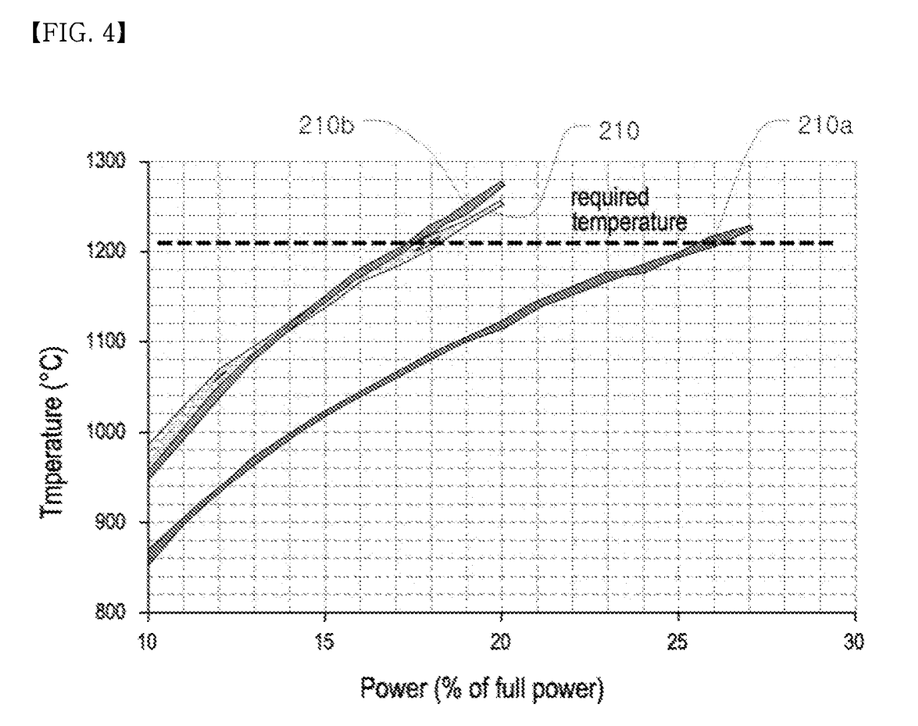

FIGS. 3 and 4 are views illustrating the relationship between the shape of the heated body and a required amount of power.

FIG. 3 illustrates the heated body 210 according to some embodiments of the present disclosure, as well as heated bodies 210a and 210b according to comparative embodiments.

As a drawback, the heated body 210a has limited ability to increase temperature and needs a greater amount of power to obtain the same temperature. In addition, with increases in the number of uses, the heated body 210a may be deformed by heat, which is problematic.

In contrast, the heated body 210b does not have such a drawback, but organic and inorganic layers formed on the glass panel 100 or the glass panel 100 may be thermally damaged, due to the increased diameter. In addition, with increases in the diameter of the heated body 210b in contact with the glass panel 100, it is more difficult to chamfer a concave edge. Thus, according to the present disclosure, the heated body 210 is designed such that the cross-sectional area of the contact region 213 (on the plane parallel to the main plane of the glass panel 100) is smaller than the cross-sectional area of the heated region 211.

Figure 5:
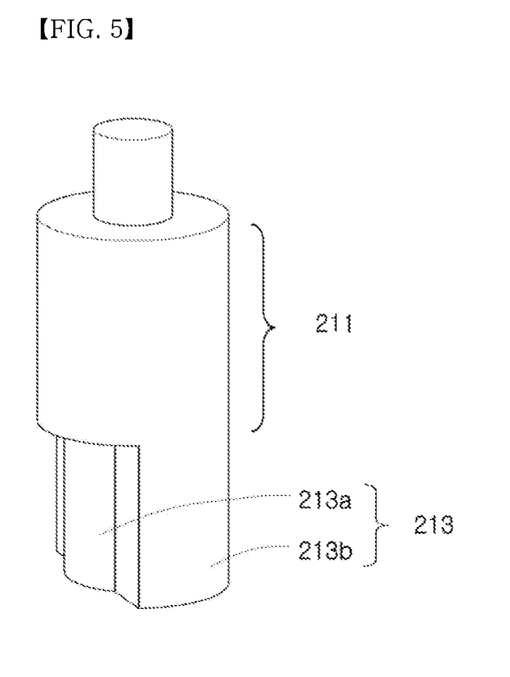
FIG. 5 is a view schematically illustrating the shape of the heated body of the glass panel heat chamfering apparatus according to some embodiments of the present disclosure.
Figure 6:
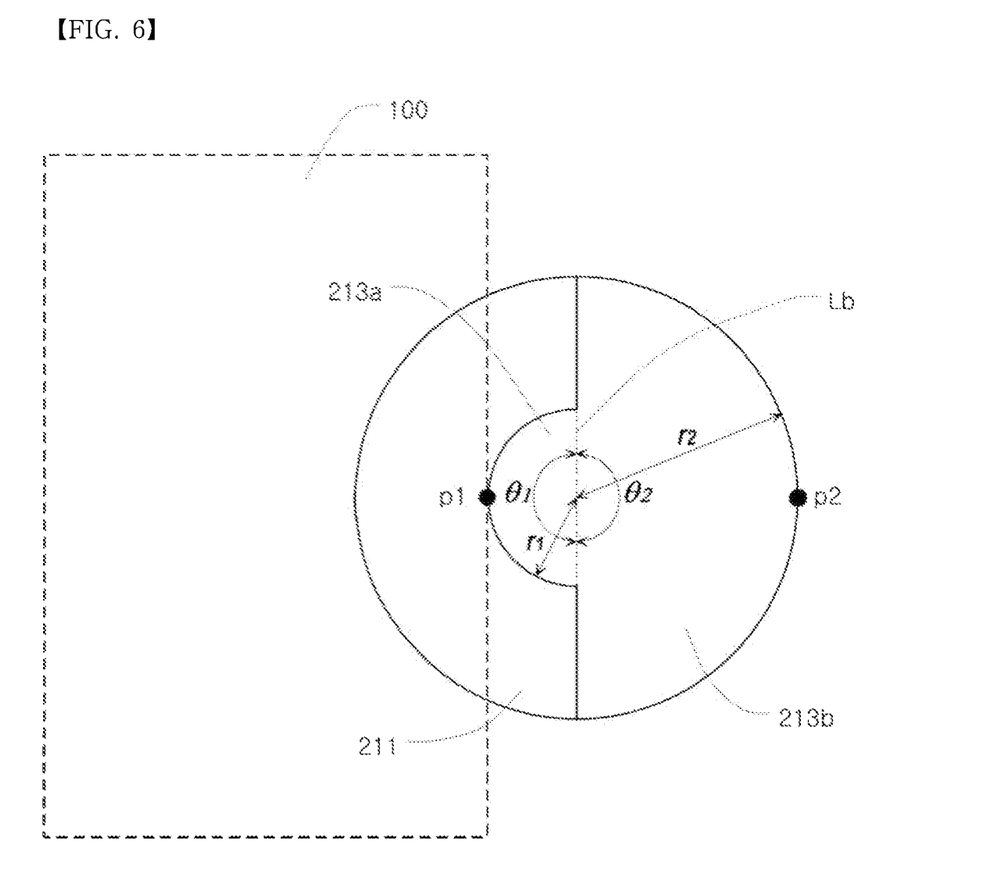
FIG. 6 is a view schematically illustrating the cross-section of the heated body in FIG. 5.

FIG. 5 is a view schematically illustrating the shape of the heated body of the glass panel heat chamfering apparatus according to some embodiments of the present disclosure, and FIG. 6 is a view schematically illustrating the cross-section of the heated body in FIG. 5.

The contact region 213 (on the plane parallel to the main plane of the glass panel 100) may have a closest point p1 located most adjacently to the glass panel 100 and a farthest point p2 located farthest from the glass panel 100. In the heat chamfering, the closest point p1 may be a point in contact with the glass panel 100, while the farthest point p2 may be a point opposite the closest point p1.

In some embodiments, (on the plane parallel to the main plane of the glass panel 100), the contact region 213 may include a first cross-section portion and a second cross-section portion divided by a perpendicular bisector Lb of a line segment connecting the closest point p1 and the farthest point p2. Here, the closest point p1 belongs to the first cross-section portion, and the farthest point p2 belongs to the second cross-section portion. The cross-sectional area of the first cross-section portion may be smaller than the cross-sectional area of the second cross-section portion.

In some embodiments, (on the plane parallel to the main plane of the glass panel 100), the contact region 213 may include a contact zone 213a including the closest point p1 and a conduction boosting zone 213b including the farthest point p2. The contact zone 213a may have a first arc as an outline, while the conduction boosting zone 213b may have a second arc as an outline. Here, the first arc and the second arc may be concentric.

Figure 7:
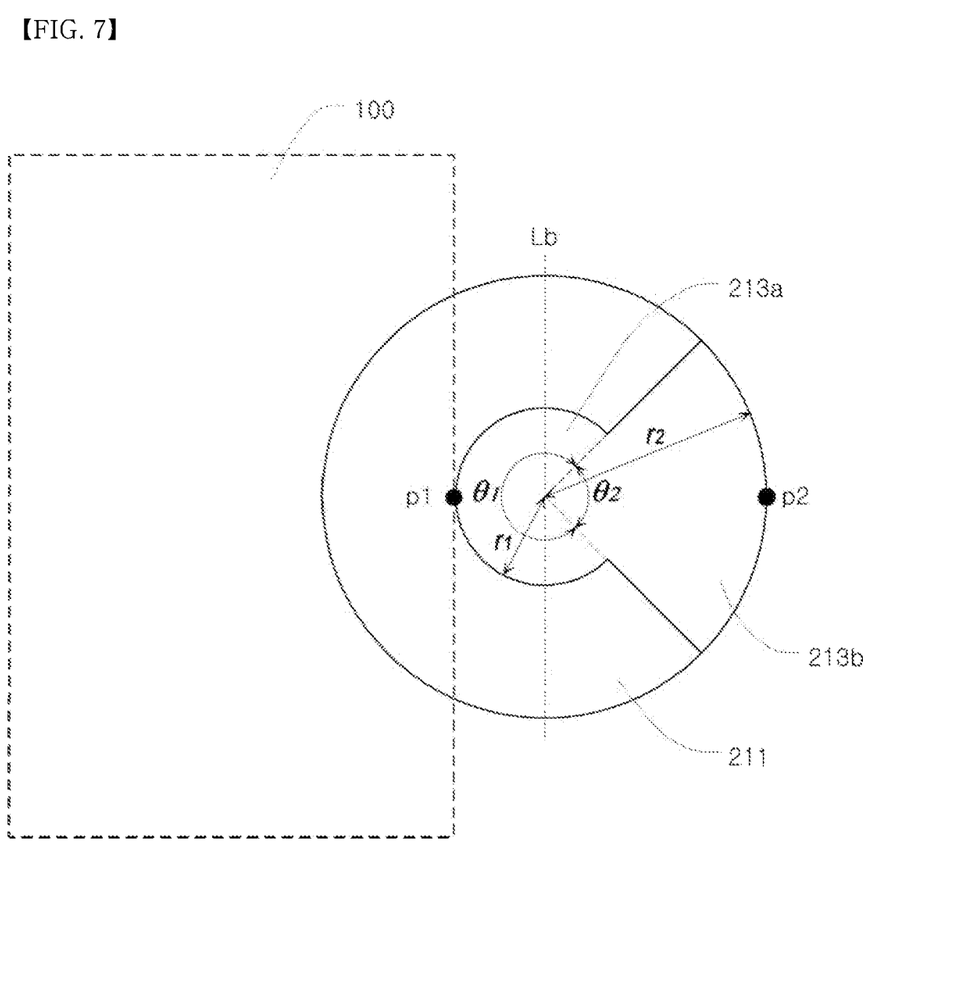
FIG. 7 is a view schematically illustrating the cross-section of the heated body of the glass panel heat chamfering apparatus according to some embodiments of the present disclosure.

FIG. 7 is a view schematically illustrating the cross-section of the heated body 210 of the glass panel heat chamfering apparatus according to some embodiments of the present disclosure.

In some embodiments, the central angle θ1 of the first arc of the contact zone 213a may be greater than the central angle θ2 of the second arc of the conduction boosting zone 213b. The heated body 210 illustrated in FIG. 7 may be more appropriate for chamfering the concave edge than the heated body 210 illustrated in FIG. 6.

Figure 8:
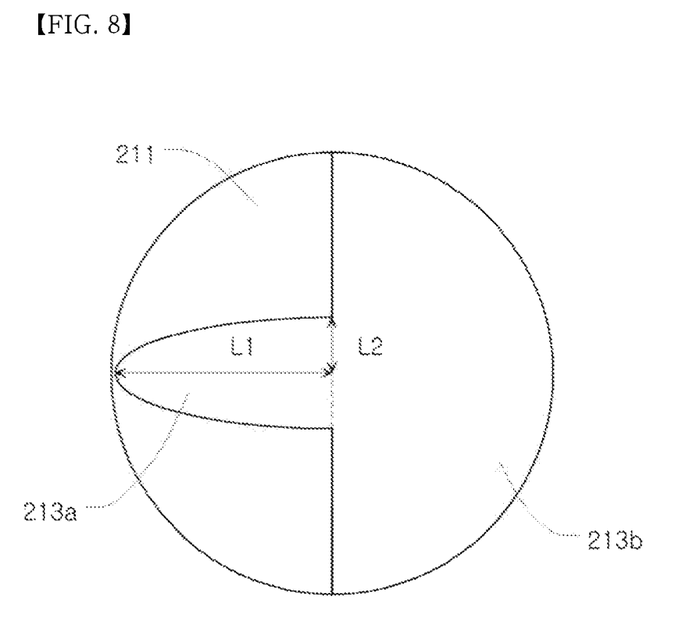
FIG. 8 is a view schematically illustrating the cross-section of the heated body of the glass panel heat chamfering apparatus according to some embodiments of the present disclosure.

FIG. 8 is a view schematically illustrating the cross-section of the heated body of the glass panel heat chamfering apparatus according to some embodiments of the present disclosure.

In some embodiments, in the contact zone 213a including the closest point p1, a first length L1 measured from the closest point p1 to farthest point p2 in a first direction may be greater than a second length L2 measured in a second direction perpendicular to the first direction.

In some embodiments, the contact zone 213a may have an elliptical arc as an outline. The first direction may be a major axis direction of the elliptical arc, while the second direction may be a minor axis direction of the elliptical arc. Since the contact zone 213a is designed so as to have an elliptical cross-section comprised of a shorter minor axis and a longer major axis, the heat chamfering apparatus appropriate for chamfering the concave edge may be provided as illustrated in FIG. 7.

Figure 9:
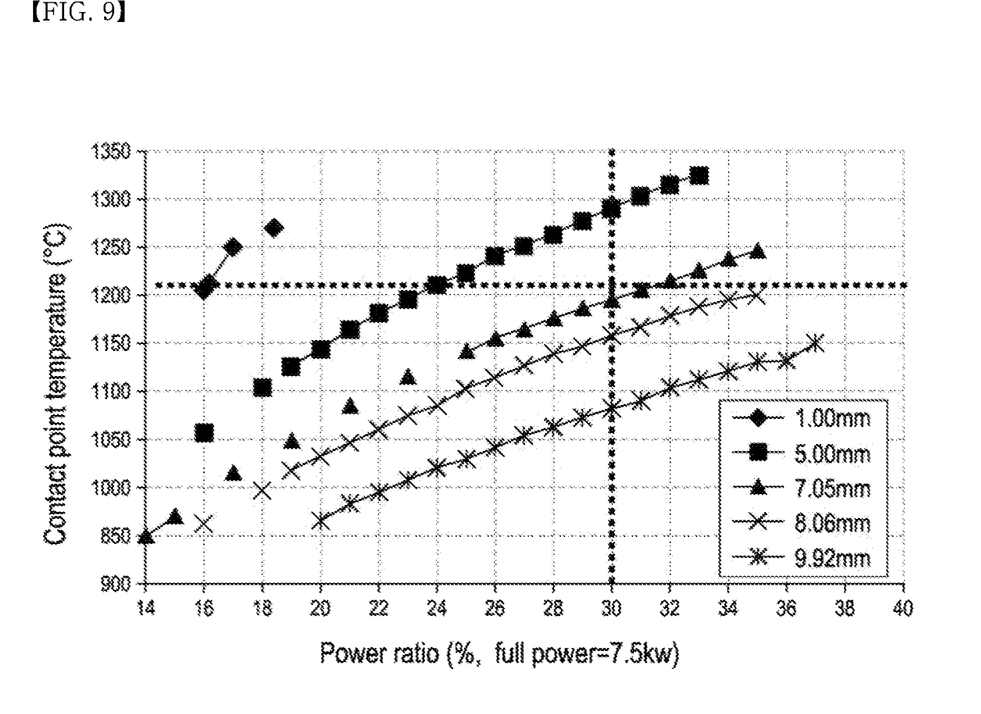
FIG. 9 is a graph illustrating the relationship among the position of the heater, the temperature of the heated body, and power.

FIG. 9 is a graph illustrating the relationship among the position of the heater, the temperature of the heated body, and power.

Power supplied to the induction coil (i.e., the heater 220) and the temperature of the contact region 213 of the heated body 210 were measured by changing the height of the induction coil (i.e., the distance from the top surface of the glass panel 100 to the induction coil) from 1.0 mm to 5.0 mm, 7.05 mm, 8.06 mm, and 9.92 mm. The heated body 210, with the radius of the contact region 213 in contact with the glass panel 100 being 6 mm and the radius of the heated region 211 enclosed by the induction coil being 10 mm, was used. As a result, it was determined that, with increases in the distance, the temperature of the contact region 213 was lowered when the same amount of power was supplied and the amount of required power was increased for the contact region 213 to have the same temperature. In some embodiments, the process temperature required may be 1210° C. In some embodiments, the height of the induction coil may be lower than 15 mm, and in some of such embodiments, the height of the induction coil may be 7.0 mm or less. When the height of the induction coil is 15 mm or more, a sufficient amount of heat may not be applied, thereby making the heat chamfering difficult.

In order to determine the thermal effect on the glass panel 100, a thermo-sensing label was attached to the glass panel 100, and then, the temperature of the glass panel 100 was measured by changing the height of the induction coil during a heat chamfering process. For the glass panel 100 coated with an OLED device layer, in some embodiments, the temperature of the glass panel 100 may be required to be 95° C. or lower. In some of such embodiments, the required temperature of the glass panel 100 may be 50° ° C. or lower. When the height of the induction coil was 1 mm, the surface temperature of the glass panel 100 was increased to exceed 95° C., thereby causing damage to the glass panel 100. In contrast, when the height of the induction coil was 5 mm, the surface temperature was 50° C. or lower, thereby causing no heat damage to the glass panel 100. In order to prevent the heat damage to the glass panel 100, the height of the induction coil in some embodiments may be set to be higher than 1 mm. In some of such embodiments, the height of the induction coil may be 5 mm or higher.

Accordingly, for reliable processing, the height of the induction coil may be higher than 1 mm and lower than 15 mm, more particularly, range from 5 mm to 7 mm.

Aspect (1) of this disclosure pertains to a heat chamfering apparatus comprising: a heated body configured to peel an edge of a glass panel by applying thermal shock to the glass panel while being in contact with the edge of the glass panel; and a heater heating the heated body, wherein the heated body comprises a heated region and a contact region in a longitudinal direction thereof, the heated region being heated by the heater, and the contact region being configured to be in contact with the glass panel, and the cross-sectional area of the contact region is smaller than the cross-sectional area of the heated region.

Aspect (2) of this disclosure pertains to the heat chamfering apparatus of Aspect (1), wherein the contact region is located on a distal end of the heated body.

Aspect (3) of this disclosure pertains to the heat chamfering apparatus of Aspect (1) or Aspect (2), wherein the heated body is a heated rod.

Aspect (4) of this disclosure pertains to the heat chamfering apparatus of any one of Aspects (1) through (3), wherein the heater heats the heated body by induction heating.

Aspect (5) of this disclosure pertains to the heat chamfering apparatus of any one of Aspects (1) through (4), wherein the heater is an induction coil heating the heated body by induction heating, and the heated body extends through a center of the induction coil.

Aspect (6) of this disclosure pertains to the heat chamfering apparatus of any one of Aspects (1) through (5), wherein the contact region has a cross-section with a diameter ranging from 3 mm to 8 mm, and the heated region has a cross-section with a diameter ranging from 6 mm to 15 mm.

Aspect (7) of this disclosure pertains to the heat chamfering apparatus of any one of Aspects (1) through (6), wherein the contact region has a closest point located most adjacently to the glass panel and a farthest point located farthest from the glass panel, and the contact region comprises a first cross-section portion to which the closest point belongs and a second cross-section portion to which the farthest point belongs, divided by a perpendicular bisector of a line segment connecting the closest point and the farthest point, a cross-sectional area of the first cross-section portion being smaller than a cross-sectional area of the second cross-section portion.

Aspect (8) of this disclosure pertains to the heat chamfering apparatus of Aspect (7), wherein the contact region comprises a contact zone including the closest point and a conduction boosting zone including the farthest point, the contact zone having a first arc as an outline, and the conduction boosting zone having a second arc as an outline, and the first arc having a smaller radius than the second arc.

Aspect (9) of this disclosure pertains to the heat chamfering apparatus of Aspect (8), wherein the first arc and the second arc are concentric.

Aspect (10) of this disclosure pertains to the heat chamfering apparatus of Aspect (8), wherein the first arc has a greater central angle than the second arc.

Aspect (11) of this disclosure pertains to the heat chamfering apparatus of any one of Aspects (7) through (10), wherein the contact region comprises a contact zone including the closest point, wherein the contact zone has a first length measured in a first direction from the closest point to the farthest point and a second length measured in a second direction perpendicular to the first direction, the first length being greater than the second length.

Aspect (12) of this disclosure pertains to the heat chamfering apparatus of Aspect (11), wherein the contact zone has an elliptical arc as an outline, the first direction being a major axis direction of the elliptical arc, and the second direction being a minor axis direction of the elliptical arc.

Aspect (13) of this disclosure pertains to a heat chamfering method comprising: peeling an edge of a glass panel by applying thermal shock to the edge of the glass panel by moving a heated body heated by a heater relatively with respect to the glass panel along and in contact with the edge of the glass panel, wherein the heated body comprises a heated region and a contact region in a longitudinal direction thereof, the heated region being heated by the heater, and the contact region being configured to be in contact with the glass panel, and the cross-sectional area of the contact region is smaller than the cross-sectional area of the heated region.

Aspect (14) of this disclosure pertains to the heat chamfering method of Aspect (13), wherein the heater is an induction coil heating the heated body by induction heating, and the heated body extends through a center of the induction coil.

Aspect (15) of this disclosure pertains to the heat chamfering method of Aspect (13) or Aspect (14), wherein a distance from a bottom surface of the induction coil to a top surface of the glass panel is greater than 1 mm and smaller than 15 mm.

Aspect (16) of this disclosure pertains to the heat chamfering method of Aspect (13) or Aspect (14), wherein the distance from the bottom surface of the induction coil to the top surface of the glass panel ranges from 5 mm to 7 mm.

Aspect (17) of this disclosure pertains to the heat chamfering method of any one of Aspects (13) through (16), wherein the glass panel is coated with an organic light-emitting device layer.

Aspect (18) of this disclosure pertains to the heat chamfering method of any one of Aspects (13) through (17), wherein the contact region has a closest point located most adjacently to the glass panel and a farthest point located farthest from the glass panel, and the contact region comprises a first cross-section portion to which the closest point belongs and a second cross-section portion to which the farthest point belongs, divided by a perpendicular bisector of a line segment connecting the closest point and the farthest point, a cross-sectional area of the first cross-section portion being smaller than a cross-sectional area of the second cross-section portion.

The present disclosure is not limited to the foregoing embodiments described above and illustrated in the drawings. Rather, a person having ordinary skill in the art will appreciate that various modifications and changes are possible without departing from the scope of the appended claims. The features described in individual claims may be combined unless explicitly described to the contrary. For example, when two dependent claims refer to an independent claim, a heat chamfering apparatus or a heat chamfering method according to an embodiment of the present disclosure may include all of the features of the two dependent claims.

What is claimed is:

1. A heat chamfering apparatus comprising:
   a heated body configured to peel an edge of a glass panel by applying thermal shock to the glass panel while being in contact with the edge of the glass panel; and
   a heater heating the heated body,
   wherein the heated body comprises a heated region and a contact region in a longitudinal direction thereof, the heated region being heated by the heater, and the contact region being configured to be in contact with the glass panel,
   the cross-sectional area of the contact region is smaller than the cross-sectional area of the heated region,
   the contact region has a closest point located most adjacently to the glass panel and a farthest point located farthest from the glass panel, and
   the contact region comprises a first cross-section portion to which the closest point belongs and a second cross-section portion to which the farthest point belongs, divided by a perpendicular bisector of a line segment connecting the closest point and the farthest point, a cross-sectional area of the first cross-section portion being smaller than a cross-sectional area of the second cross-section portion.

2. The heat chamfering apparatus of claim 1, wherein the contact region is located on a distal end of the heated body.

3. The heat chamfering apparatus of claim 2, wherein the heated body is a heated rod.

4. The heat chamfering apparatus of claim 2, wherein heater heats the heated body by induction heating.

5. The heat chamfering apparatus of claim 1, wherein the heated body is a heated rod.

6. The heat chamfering apparatus of claim 1, wherein the heater heats the heated body by induction heating.

7. The heat chamfering apparatus of claim 1, wherein the heater is an induction coil heating the heated body by induction heating, and
the heated body extends through a center of the induction coil.

8. The heat chamfering apparatus of claim 1, wherein the contact region has a cross-section with a diameter ranging from 3 mm to 8 mm, and the heated region has a cross-section with a diameter ranging from 6 mm to 15 mm.

9. The heat chamfering apparatus of claim 1, wherein the contact region comprises a contact zone including the closest point and a conduction boosting zone including the farthest point,
the contact zone having a first arc as an outline, and the conduction boosting zone having a second arc as an outline, and
the first arc having a smaller radius than the second arc.

10. The heat chamfering apparatus of claim 9, wherein the first arc and the second arc are concentric.

11. The heat chamfering apparatus of claim 9, wherein the first arc has a greater central angle than the second arc.

12. A heat chamfering apparatus comprising:
a heated body configured to peel an edge of a glass panel by applying thermal shock to the glass panel while being in contact with the edge of the glass panel; and
a heater heating the heated body,
wherein the heated body comprises a heated region and a contact region in a longitudinal direction thereof, the heated region being heated by the heater, and the contact region being configured to be in contact with the glass panel,
the cross-sectional area of the contact region is smaller than the cross-sectional area of the heated region,
the contact region comprises a contact zone including a closest point located most adjacently to the glass panel and a farthest point located farthest from the glass panel, and
the contact zone has a first length measured in a first direction from the closest point to the farthest point and a second length measured in a second direction perpendicular to the first direction, the first length being greater than the second length.

13. The heat chamfering apparatus of claim 12, wherein the contact zone has an elliptical arc as an outline,
the first direction being a major axis direction of the elliptical arc, and the second direction being a minor axis direction of the elliptical arc.

14. The heat chamfering apparatus of claim 12, wherein the contact region is located on a distal end of the heated body.

15. The heat chamfering apparatus of claim 14, wherein the heated body is a heated rod.

16. The heat chamfering apparatus of claim 14, wherein the heater heats the heated body by induction heating.

17. The heat chamfering apparatus of claim 12, wherein the heated body is a heated rod.

18. The heat chamfering apparatus of claim 12, wherein the heater heats the heated body by induction heating.

19. The heat chamfering apparatus of claim 12, wherein the heater is an induction coil heating the heated body by induction heating, and the heated body extends through a center of the induction coil.

20. The heat chamfering apparatus of claim 12, wherein the contact region has a cross-section with a diameter ranging from 3 mm to 8 mm, and the heated region has a cross-section with a diameter ranging from 6 mm to 15 mm.

* * * * *